Figure 1:
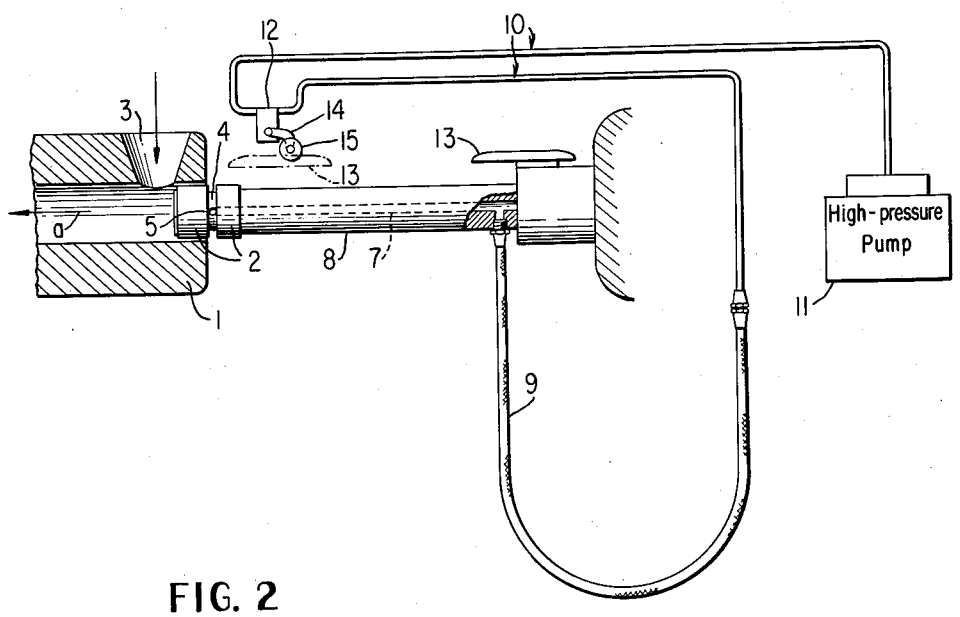

Nov. 19, 1963 K. KADEL 3,110,931
CASTING INSTALLATION WITH AUTOMATIC LUBRICATION SYSTEM
Filed Sept. 14, 1961

INVENTOR.
KARL KADEL
BY *Dicke and Craig*
ATTORNEYS

3,110,931
CASTING INSTALLATION WITH AUTOMATIC
LUBRICATION SYSTEM
Karl Kadel, Stuttgart-Unterturkheim, Germany, assignor to Daimler-Benz Aktiengesellschaft, Stuttgart-Unterturkheim, Germany
Filed Sept. 14, 1961, Ser. No. 138,155
Claims priority, application Germany Sept. 17, 1960
5 Claims. (Cl. 18—12)

The present invention relates to a pressure-casting machine and more particularly to an automatically-controlled lubricating system for such pressure casting installations.

In order to avoid wear and erosion of the pressure pistons of pressure-casting machines, the pistons thereof have to be amply lubricated. This is realized in the most simple manner by lubrication of the piston track within the pressure cylinder.

To date, such lubrication is realized either by manual to and fro motion of a wiper soaked with a lubricant and secured to one end of a rod or by injection or spray-discharge of the lubricant into the cylinder from one end thereof.

The manual lubrication is complicated, is effective unevenly and requires relatively long interruptions between casting operations.

The spray or injection lubrication is also effective unevenly in such a manner that it only lubricates within proximity of the spray nozzle but produces an inadequate lubrication at a larger distance therefrom. In order to compensate for such shortcomings, an excessively abundant lubrication has to be accepted in such prior art construction within proximity of the nozzle which again entails the disadvantage that too much of the lubricant evaporates within the hot pressure cylinder and reaches the casting mass or charge as undesired gas component.

The present invention eliminates the aforementioned disadvantages and essentially consists in a high pressure lubricating system for both the pressure cylinder and the pressure piston whereby the lubricant is supplied through the pressure piston, preferably in dependence on the stroke thereof.

Accordingly, it is an object of the present invention to provide a lubricating system for a pressure-casting machine which provides adequate lubrication over the entire piston track within the pressure cylinder without excessive lubrication in any place and therewith effectively eliminates the shortcomings and inadequacies encountered in the prior art constructions by simple and relatively inexpensive means.

Another object of the present invention resides in the provision of a high pressure lubricating system for pressure casting machines in which the lubricant is supplied fully automatically in such a manner as to eliminate long periods of interruption in the casting operations and also avoid effectively both excessive and inadequate lubrication of the pressure cylinder.

Still a further object of the present invention resides in the provision of a high pressure lubricating system for pressure-casting machines in which excessive lubrication is avoided to prevent inclusion of any excess lubricant in vaporized gaseous form within the casting charge without, however, impairing the adequate lubrication that is necessary to prevent any erosion of the piston.

Figure 2:
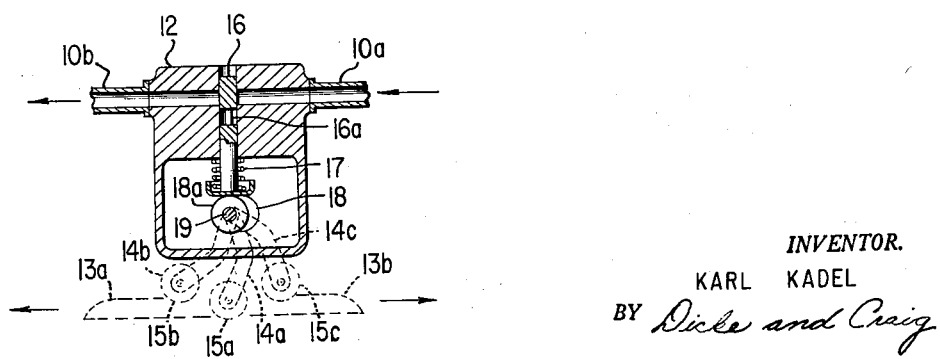

These and other objects, features and advantages of the present invention will become more obvious from the following description when taken in connection with the accompanying drawing which shows, for purposes of illustration only, one embodiment of a fully automatic high-pressure lubricating system for a pressure-casting machine in accordance with the present invention, and wherein FIGURE 1 is a schematic view of a high-pressure lubricating system in accordance with the present invention, and FIGURE 2 is a partial cross-sectional view, on an enlarged scale, through the actuating arrangement for valve 12.

Referring now to the drawing wherein like reference numerals are used throughout the various views to designate corresponding parts, and more particularly to FIGURE 1 which illustrates schematically a fully automatic high-pressure lubricating system in accordance with the present invention, reference numeral 1 designates therein the pressure cylinder and reference numeral 2 the pressure piston adapted to slide within the pressure cylinder both of which may be of any suitable construction. The mass or charge to be cast is supplied to the pressure cylinder 1 through the aperture 3 and is transferred by the pressure piston 2 moving in the direction of arrow $a$ into the mold connected with the pressure cylinder 1.

According to the present invention, the pressure piston 2 is provided with an annular lubricating groove 4 which is in communication through one or several radial bores 5, particularly through several radial bores evenly distributed over the piston cross section, with a central channel or duct 7 within the piston rod 8. The channel 7 is connected through a flexible line 9 with the supply line 10 of a high pressure lubricating pump 11 of any suitable conventional construction. A closure valve 12 of any known construction is arranged within line 10 which valve 12 is actuated, for example, by a control rail 13 that moves in the same direction or in unison with the pressure piston 2. In the course of its displacement, the rail 13 moves below a roller 15 provided at an adjusting lever 14 of the valve 12. The adjustable control rail 13 is so arranged, constructed and dimensioned in any suitable manner that the valve 12 opens the path to the flow of the lubricant in the direction toward the annular groove 4 as soon as the pressure piston 2 begins its outward or expansion stroke and that the lubricant pressure continues for such length of time until the lubricating groove 4 leaves the pressure cylinder 1. This may be achieved in any conventional means and by appropriate construction of valve 12. FIGURE 2 illustrates one arrangement, utilizing conventional parts to achieve the actuation of the valve in the manner indicated hereinabove. The opening of the lubricating oil passage by means of valve 12 from the line section 10$a$ coming from the high-pressure pump to the line section 10$b$ leading to the pressure-piston 2 takes place by an axially movable spool-type control slide valve member 16 which under the influence of a spring 17 rests against a cam 18 provided on the bearing pin 19 of the pivotal actuating lever 14. In the center position, the roller 15 and lever 14 assume the positions 15$a$ and 14$a$. The control slide valve member 16 thereby rests in the lower position thereof against the cylindrical section 18$a$ of the cam 18 which points horizontally toward the right as viewed in FIGURE 2, that is, in the roller-lever position 15$a$—14$a$.

If now during the piston stroke of the piston 2 the control rail 13 contacts, during the movement thereof toward the left (13$a$), the roller 15, then the lever 14 and roller 15 are also taken along toward the left in the clockwise direction (15$b$), however, the position of the control slide valve member 16 remains unchanged because only the cylindrical part 18$a$ of the cam 18 moves under the slide valve member 16. As soon as the control rail 13 has again left the area of the roller 15 in the direction of its movement 13$a$, the roller 15 together with the lever 14 again reassume the center positions 15$a$—14$a$ thereof, for example, under the influence of a torsion spring (not illustrated) engaging the pin 19 or under the influence of the weight itself of roller 15 and lever 14. Only during the subsequent oppositely directed countermovements of the control rail 13 in the direction 13b, i.e., during the outwardly directed stroke of the pressure piston 2, the control rail 13 engages the roller 15 from the left thereof and thereby moves the same to the position 15c whereby the raised portion of cam 18 now comes to lie underneath the control slide valve member 16 and lifts the same against the force of its control spring 17. The flow passage from line section 10a to the line section 10b is thereby opened by the reduced section 16a of the control slide valve member 16. As soon as the control rail 13 again leaves the area of the roller 15, the lever 14 and roller 15 return to the central positions 15a—14a thereof. In order to avoid an excessive loss of lubricant dripping out of the annular groove 4 in this piston position, i.e., in the position as illustrated in FIGURE 1, the annular lubricating groove 4 is made correspondingly small. The lubricant dripping off from the annular groove 4 may be caught and collected in any suitable manner and after being thus collected may be re-supplied in any conventional manner to the high pressure pump 11.

As small as possible an annular groove 4, just dimensioned sufficiently for the intended lubrication is also recommended for the further reason to prevent an excessively large lubrication which otherwise evaporates and reaches the casting mass or charge as gas. For that purpose, the lubricating groove cross section and the lubricant supply are so matched to the cylinder surface to be lubricated that only a relatively thin lubricating film results in the course of the lubrication in accordance with the present invention.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:
1. A pressure casting machine, comprising pressure cylinder means including a filling space and pressure piston means adapted to slide within said cylinder means including a piston rod provided with an annular groove near the end thereof facing the filling space of said cylinder means, with a channel within said piston rod and with radial bore means connecting said channel with said annular groove, a high pressure lubricating system for the pressure cylinder walls along with said piston means slides including a source of liquid lubricant, high-pressure pump means connected to said source, means including supply line means connecting said pump means to said channel for supplying the lubricant from said pump means to said pressure cylinder walls through the channel, radial bore means and the annular groove of said pressure piston means, and control means for automatically supplying the pressure lubricant throughout substantially the entire outward travel of said piston means including closure valve means within said supply line means.

2. A pressure casting machine, comprising pressure cylinder means including a filling space and pressure piston means adapted to slide within said cylinder means including a piston rod provided with an annular groove near the end thereof facing the filling space of said cylinder means, with a channel within said piston rod and with radial bore means connecting said channel with said annular groove, a high pressure lubricating system for the pressure cylinder walls along which said piston means slides including a source of liquid lubricant, high-pressure pump means connected to said source, means including supply line means connecting said pump means to said channel for supplying the lubricant from said pump means to said pressure cylinder walls through the channel, radial bore means and the annular groove of said pressure piston means, and control means for automatically controlling the supply of the pressure lubricant in dependence on the piston path only during the outward stroke of said piston means including closure valve means within said supply line means and a control member moving in the same direction as and synchronously with said piston means, said control member actuating said valve means in such a manner as to open said supply line means as long as said piston means carries out its outward stroke.

3. A lubricating system for supplying a liquid lubricant to the cylinder walls of a pressure-casting machine having pressure cylinder means and pressure piston means slidable within said pressure cylinder means, said piston means being provided with an annular groove in the outer surface thereof near the end facing the cylinder means and a channel within the piston means connected to said annular groove, comprising a source of liquid lubricant, high pressure pump means connected to said source, means including a supply line connecting said pump means to said channel for supplying high pressure lubricant by said pump means from said source to said cylinder walls through said channel in said piston means and said annular groove, and control means for automatically supplying pressure fluid from said pump means to said annular groove only during the outward stroke of said piston means automatically in dependence on the pressure piston path including closure valve means connected into said supply line, and a valve-actuating control member movable in substantially the same direction and at the same time with said piston means, and means so correlating said valve-actuating control member to said valve means that said supply line is opened substantially during the entire outward stroke of said piston means.

4. A lubricating system for supplying a liquid lubricant to the cylinder walls of a pressure-casting machine having pressure cylinder means including a filling space and pressure piston means slidable within said pressure cylinder means, said pressure piston means being provided with an annular groove in the outer surface thereof near the end facing the filling space of said cylinder means and with a channel connected to said annular groove, comprising a source of liquid lubricant, high pressure pump means connected to said source, means including a supply line connecting said pump means to said channel for supplying high pressure lubricant by said pump means to said cylinder walls through said channel in said piston means and said annular groove, and control means for automatically supplying pressure lubricant from said pump means to said annular groove only during the outward stroke of said piston means in dependence on the pressure piston path including closure valve means provided with a valve lever carrying a roller member, said valve means being operatively connected in said supply line, and a valve-actuating control member movable in substantially the same direction and at the same time with said piston means, said control member forming a control rail passing underneath said roller member, and means so correlating said valve-actuating control member to said valve means that said supply line is opened substantially during the entire outward stroke of said piston means.

5. A lubricating system for supplying a liquid lubricant to the cylinder walls of a pressure-casting machine having pressure cylinder means including a filling space and pressure piston means slidable within said pressure cylinder means, said pressure piston means including an annular groove in the outer surface thereof near the end facing the filling space of said cylinder means and with a channel connected to said annular groove, comprising a source of liquid lubricant, high pressure pump means connected to said source, means including a supply line connecting said pump to said channel for supplying high pressure lubricant by said pump means to said cylinder walls through said channel in said piston means and said annular groove, and control means for automatically supplying pressure lubricant from said pump means to said annular groove only during the outward stroke of said piston means in dependence on the pressure piston path including closure valve means provided with a valve lever carrying a roller member and operatively connected in said supply line, and a valve-actuating control member movable in substantially the same direction and at the same time with said piston means, said control member forming a control rail passing underneath said roller member, and means so correlating said valve-actuating control member to said valve means that said supply line is opened substantially during the entire outward stroke of said piston means including means for adjustably securing said control rail at a part displacing said piston means in an adjustable manner relative to said roller member.

References Cited in the file of this patent

UNITED STATES PATENTS

| | | |
|---|---|---|
| 286,892 | Andrus | Oct. 16, 1883 |
| 2,307,055 | Menger et al. | Jan. 5, 1943 |
| 2,754,562 | Webb | July 17, 1956 |